United States Patent
Yoo

(10) Patent No.: US 9,094,554 B2
(45) Date of Patent: Jul. 28, 2015

(54) HOST APPARATUS AND SYSTEM TO CONTROL DUPLEX PRINTING AND METHOD THEREOF

(75) Inventor: Hyung-jae Yoo, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1023 days.

(21) Appl. No.: 12/558,639

(22) Filed: Sep. 14, 2009

(65) Prior Publication Data

US 2010/0128307 A1    May 27, 2010

(30) Foreign Application Priority Data

Nov. 27, 2008    (KR) .................. 10-2008-0118811

(51) Int. Cl.
G06F 3/12 (2006.01)
G06K 15/00 (2006.01)
H04N 1/00 (2006.01)

(52) U.S. Cl.
CPC ............ *H04N 1/00681* (2013.01); *G06F 3/125* (2013.01); *G06F 3/1211* (2013.01); *G06F 3/1221* (2013.01); *G06F 3/1284* (2013.01); *H04N 1/00694* (2013.01); *H04N 1/00779* (2013.01); *G06F 3/1205* (2013.01); *Y02B 60/1271* (2013.01)

(58) Field of Classification Search
CPC .................................................. G06F 3/1252
See application file for complete search history.

(56) References Cited

U.S. PATENT DOCUMENTS

| 4,924,275 | A | * | 5/1990 | Nelson .................... 399/401 |
| 5,889,594 | A | * | 3/1999 | Maekawa .................. 358/296 |
| 6,690,477 | B2 | | 2/2004 | Nakagiri et al. |
| 7,259,874 | B2 | | 8/2007 | Nishikawa et al. |
| 7,474,424 | B2 | | 1/2009 | Hokiyama |
| 7,912,396 | B2 | | 3/2011 | Park |
| 2001/0013942 | A1 | * | 8/2001 | Sakamoto et al. ........... 358/1.13 |
| 2002/0191207 | A1 | * | 12/2002 | Wells et al. .................. 358/1.14 |
| 2003/0161671 | A1 | * | 8/2003 | Hokiyama .................. 400/188 |
| 2005/0053403 | A1 | | 3/2005 | Tsukamoto |
| 2005/0146739 | A1 | * | 7/2005 | Rayl et al. .................... 358/1.13 |
| 2006/0204270 | A1 | * | 9/2006 | Abe ................................ 399/82 |
| 2006/0291890 | A1 | * | 12/2006 | Park ............................... 399/82 |
| 2009/0003846 | A1 | | 1/2009 | Yoo |
| 2009/0273806 | A1 | | 11/2009 | Nishikawa et al. |

FOREIGN PATENT DOCUMENTS

JP    10-143342    5/1998
JP    11-70717     3/1999

(Continued)

OTHER PUBLICATIONS

Korean Office Action issued in 2008-0118811 dated Nov. 1, 2012.

(Continued)

*Primary Examiner* — King Poon
*Assistant Examiner* — Vincent Peren
(74) *Attorney, Agent, or Firm* — Staas & Halsey LLP

(57) ABSTRACT

A method of controlling duplex printing and a host apparatus and a system for performing the method. The method includes determining whether a number of total printing pages of printing data is an even number or an odd number, generating a printing command with respect to the printing data based on the result of determination, and transmitting the generated printing command and the printing data to an image forming apparatus.

12 Claims, 2 Drawing Sheets

(56) References Cited

FOREIGN PATENT DOCUMENTS

| | | |
|---|---|---|
| JP | 11-110172 | 4/1999 |
| JP | 11-291575 | 10/1999 |
| JP | 11-291590 | 10/1999 |
| JP | 11-355546 | 12/1999 |
| JP | 2002-059594 | 2/2002 |
| JP | 2002-114425 | 4/2002 |
| JP | 2002-163085 | 6/2002 |
| JP | 2002-229391 | 8/2002 |
| JP | 2003-263074 | 9/2003 |
| JP | 2003-276285 | 9/2003 |
| JP | 2004-12982 | 1/2004 |
| JP | 2004-69881 | 3/2004 |
| JP | 2004-77746 | 3/2004 |
| JP | 2004-226586 | 8/2004 |
| JP | 2004-255675 | 9/2004 |
| JP | 2004-279450 | 10/2004 |
| JP | 2004-361499 | 12/2004 |
| JP | 2005-47029 | 2/2005 |
| JP | 2005-84369 | 3/2005 |
| JP | 2006-067352 | 3/2006 |
| JP | 2006-99642 | 4/2006 |
| JP | 2007-8159 | 1/2007 |
| JP | 2008-180926 | 8/2008 |
| KR | 20000032743 | 6/2000 |
| KR | 2008-0114430 | 12/2008 |

OTHER PUBLICATIONS

Korean Notice of Final Rejection dated May 10, 2013 issued in KR Application No. 10-2008-0118811.

* cited by examiner

HOST APPARATUS AND SYSTEM TO CONTROL DUPLEX PRINTING AND METHOD THEREOF

CROSS-REFERENCE TO RELATED APPLICATIONS

This application claims the benefit of priority under 35 U.S.C. §119(a) from Korean Patent Application No. 10-2008-0118811, filed on Nov. 27, 2008, in the Korean Intellectual Property Office, the disclosure of which is incorporated herein by reference in its entirety.

BACKGROUND

1. Field of the Invention

The present general inventive concept relates to a method of controlling duplex printing of printing data in an image forming apparatus having a duplex printing function and a host apparatus and a system to perform the method.

2. Description of the Related Art

In general, an image forming apparatus refers to an apparatus having at least one of the following functions: printing, copying, scanning, faxing, etc. Duplex printing, which is one of these functions, refers to printing on both sides of a piece of paper. However, when a document having an odd number of pages is output to the image forming apparatus in which a duplex printing function is set up, the last piece of paper, which has printing data on one side only, is also printed according to the process of duplex printing. When duplex printing is performed in an image forming apparatus, printing is performed first on one side of a piece of printing paper, and then the printing paper moves along a reverse path so that the printing paper is reversed for duplex printing. Thus, when printing a document consisting of an odd number of pages, the last printing paper also moves along the reverse path. Accordingly, inner rollers in the image forming apparatus are unnecessarily driven to pass the paper therethrough, and thus power consumption and noise are increased and the printing speed is decreased.

SUMMARY

The present general inventive concept provides a method of controlling duplex printing of printing data in an image forming apparatus having a duplex printing function and a host apparatus and a system for performing the method.

Additional features and utilities of the present general inventive concept will be set forth in part in the description which follows and, in part, will be obvious from the description, or may be learned by practice of the general inventive concept.

Embodiments of the present general inventive concept can be achieved by providing a method of controlling duplex printing of a system including an image forming apparatus including a duplex printing function and a simplex printing function and a host apparatus to transmit printing data to the image forming apparatus, the method including determining whether a number of total printing pages for the printing data is an even number or an odd number, generating a printing command according to the result of determination, and transmitting the generated printing command and the printing data to the image forming apparatus.

The generating of a printing command may include generating a duplex printing command for the printing data when the number of the total printing pages is an even number, and generating a duplex printing command for the printing data for pages from among the total printing pages except a last page and a simplex printing command for the printing data for the last page when the number of the total printing pages is an odd number.

The determining may be performed only when a duplex printing mode is set for the printing data.

The generating of a printing command may include generating a simplex printing command for the printing data when the number of the total printing pages is 1.

The method may further include setting the duplex printing command and the printing data of pages among the total printing pages except the last page in a first printing operation and setting the simplex printing command and the printing data of the last page in a second printing operation when the number of the total printing pages is an odd number.

The generating of a printing command may include generating the duplex printing command and the printing data for pages among the total printing pages except the last page and the simplex printing command and the printing data of the last page as a printing operation when the number of the total printing pages is an odd number.

Embodiments of the present general inventive concept can also be achieved by providing a computer-readable medium A computer-readable medium to contain computer-readable codes providing commands for computers to execute a process including determining whether a number of total printing pages for a printing data is an even number or an odd number, generating a printing command according to the result of determination, and transmitting the generated printing command and the printing data to an image forming apparatus.

Embodiments of the present general inventive concept can also be achieved by providing a host apparatus to transmit printing data to an image forming apparatus having a duplex printing function and a simplex printing function, the host apparatus including a determining unit to determine whether a number of total printing pages of the printing data is an even number or an odd number, a printing command generating unit to generate a printing command differently for the printing data according to the result of determination, and a transmitting unit to transmit the generated printing command and the printing data to the image forming apparatus.

The printing command generating unit may generate a duplex printing command for the printing data when the number of the total printing pages is an even number, and the printing command generating unit generates a duplex printing command for the printing data for pages from among the total printing pages except a last page and a simplex printing command for the printing data for the last page when the number of the total printing pages is an odd number.

The host apparatus may also include a set up unit to set a printing mode for the printing data, wherein the determining unit operates only when a duplex printing mode is set up by the set up unit.

The printing command generating unit may generate a simplex printing command for the printing data when the number of the total printing pages is 1.

The printing command generating unit may generate the duplex printing command and the printing data for pages from among the total printing pages except the last page in a first printing operation and the simplex printing command and the printing data for the last page in a second printing operation when the number of the total pages is an odd number.

The printing command generating unit may generate the duplex printing command, the printing data for pages from among the total printing pages except the last page, the simplex printing command, and the printing data for the last page as a printing operation when the number of the total printing pages is an odd number.

Embodiments of the present general inventive concept can also be achieved by providing a system to control duplex printing including a host apparatus to generate a printing command for printing data according to whether a number of total printing pages of the printing data is an even number or an odd number, and an image forming apparatus to print the printing data according to the printing command received from the host apparatus.

The host apparatus may include a set up unit that sets a printing mode for the printing data, a determining unit to determine whether a number of total printing pages of the printing data is an even number or an odd number, a printing command generating unit to generate a printing command for the printing data according to the result of the determination, and a transmitting unit to transmit the generated printing command and the printing data to the image forming apparatus.

The printing command generating unit may generate a duplex printing command for the printing data when the number of the total printing pages is an even number, and the printing command generating unit generates a duplex printing command for the printing data for pages from among the total printing pages except a last page and a simplex printing command for the printing data for the last page when the number of the total printing pages is an odd number.

The printing command generating unit may generate a simplex printing command for the printing data when the number of the total printing pages is 1.

The printing command generating unit may generate the duplex printing command and the printing data for pages from among the total printing pages except the last page in a first printing operation and the simplex printing command and the printing data for the last page in a second printing operation when the number of the total pages is an odd number.

The printing command generating unit may generate the duplex printing command, the printing data for pages from among the total printing pages except the last page, the simplex printing command, and the printing data for the last page as a printing operation when the number of the total printing pages is an odd number.

The image forming apparatus may include a receiving unit to receive the generated printing command and the printing data from the host apparatus, a printing command processing unit to interpret the generated printing command and the printing data, a printing unit to print the printing data based on the interpretation of the generated printing command and the printing data, and a printing control unit to receive the interpreted generated printing command and the printing data and to control the printing unit based on the interpreted generated printing command and the printing data.

Embodiments of the present general inventive concept can also be achieved by providing a method of controlling duplex printing of printing data, including determining a number of total printing pages for the printing data is an odd number, generating a first simplex printing command when the number of total printing pages is one, and generating a duplex printing command when the number of total printing pages is greater than or equal to three for printing data for pages among the total printing pages except a last page and a second simplex printing command for the last page.

The method may further include transmitting the generated printing commands and corresponding printing data to an image forming apparatus.

Embodiments of the present general inventive concept can also be achieved by providing a host apparatus to transmit printing data, including a determining unit to determine a number of total printing pages for the printing data is an odd number, and a generating unit to generate a first simplex printing command when the number of total printing pages is one or a duplex printing command when the number of total printing pages is greater than or equal to three for printing data for pages among the total printing pages except a last page and a second simplex printing command for the last page.

The host apparatus may further include a transmitting unit to transmit the generated printing commands and corresponding printing data to an image forming apparatus.

Embodiments of the present general inventive concept can also be achieved by providing a computer-readable medium to contain computer-readable codes providing commands for computers to execute a process including determining a number of total printing pages for printing data is an odd number, generating a first simplex printing command when the number of total printing pages is one, and generating a duplex printing command when the number of total printing pages is greater than or equal to three for printing data for pages among the total printing pages except a last page and a second simplex printing command for the last page.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
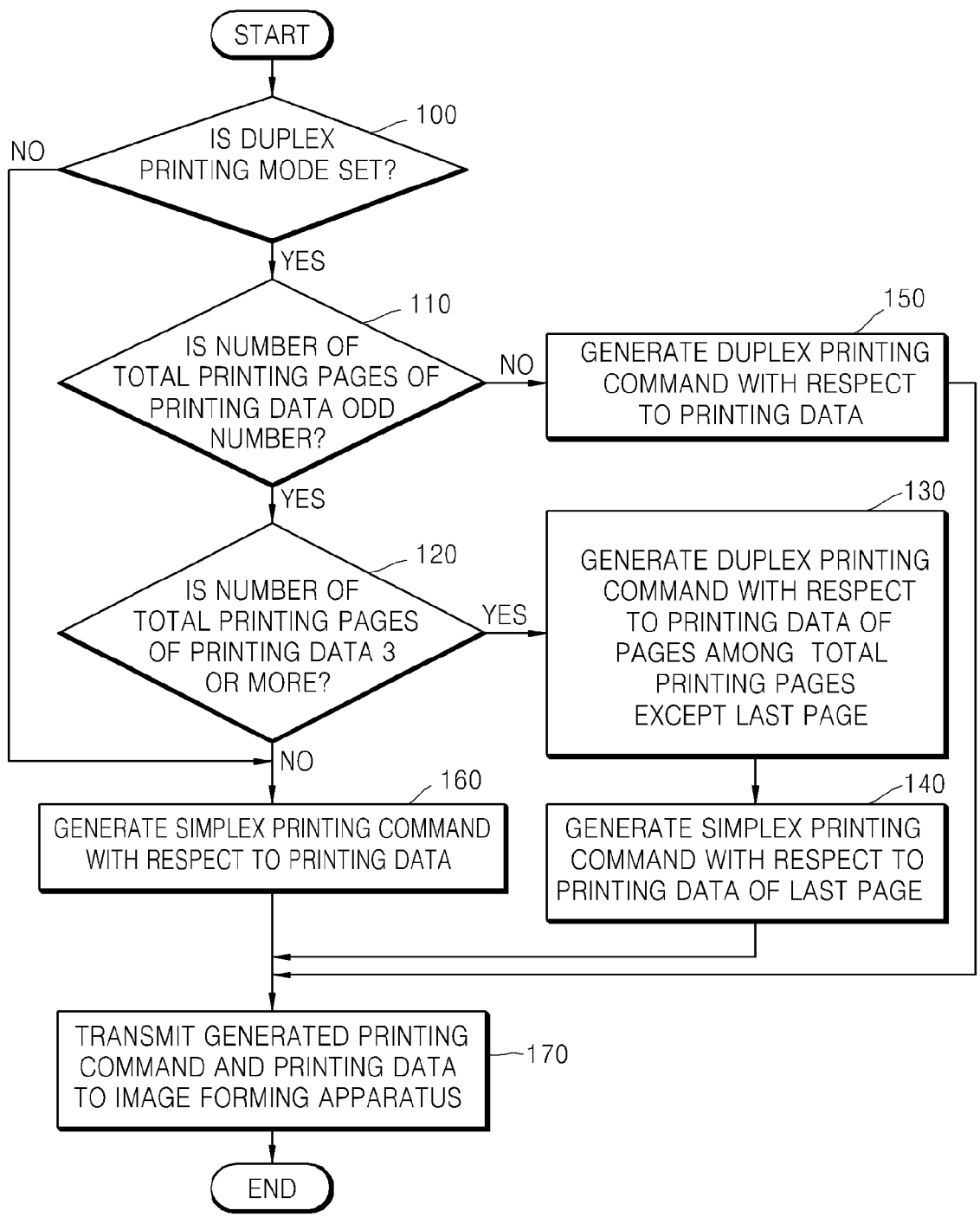
FIG. 1 is a flowchart illustrating a method of controlling duplex printing according to an exemplary embodiment of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below to explain the present general inventive concept by referring to the figures.

FIG. 1 is a flowchart illustrating a method of controlling duplex printing according to an exemplary embodiment of the present general inventive concept. The method of controlling duplex printing according to the present exemplary embodiment is performed in a system including an image forming apparatus having a duplex printing function and a simplex printing function and a host apparatus that transmits printing data to the image forming apparatus.

In operation 100, it is determined whether a duplex printing mode is set for printing data. The host apparatus may set various functions with respect to printing data to be output to the image forming apparatus, and here, it is determined whether a duplex printing mode, in which two sides of a printing medium are printed on, is set. For example, the host apparatus may set a duplex printing function, a simplex printing function, and the like. When a duplex printing mode is set, operation 110 is performed, and if the duplex printing mode is not set, operation 160 is performed.

In operation 110, it is determined whether a number of total printing pages of the printing data is an odd number. Printing data may include at least one printing page, and it is determined whether the number of the total printing pages of the printing data is an odd number. If the number of the total printing pages of the printing data is an odd number, operation 120 is performed, and if the number of the total printing pages of the printing data is an even number, operation 150 is performed.

In operation 120, it is determined whether the number of the total printing pages of the printing data is greater than or equal to 3. In the method of controlling duplex printing according to the present exemplary embodiment, when the number of the total printing pages is an odd number, even if the number is 1, the duplex printing is performed differently. If the number of the total printing pages of the printing data is greater than or equal to 3, operation 130 is performed. If the number of the total printing pages of the printing data is 1, operation 160 is performed.

In operation 130, a duplex printing command is generated for printing data of pages among the total printing pages except a last page. In other words, in operation 130 a duplex printing command is generated for every page of printing data, except the last page. For example, if the number of the total printing pages is 7, a duplex printing command is generated with respect to printing data of pages 1 to 6. Once the duplex printing command is generated in operation 130, operation 140 is performed.

In operation 140, a simplex printing command is generated for printing data of the last page. In other words, a duplex print command is generated in operation 130 for every page of the printing data except the last page, and a simplex printing command is generated in operation 140 for the last page. For example, if the number of the total printing pages is 7, a simplex printing command for the printing data of page 7 is generated.

In operation 150, a duplex printing command is generated with respect to the printing data. If the number of the total printing pages of the printing data is an even number, as determined in operation 110, a duplex printing command is generated in operation 150 with respect to the printing data. Duplex printing is performed with respect to the whole printing data when the number of the total printing pages of the printing data is an even number, and thus a duplex printing command is generated for the printing data in operation 150.

In operation 160, a simplex printing command is generated with respect to the printing data. A simplex printing command is generated with respect to the printing data when a duplex printing mode is not set for the printing data in the host apparatus, as determined in operation 100, or the printing data consists of one page, as determined in operation 120. The printing commands generated in operations 130 and 140 may be generated as one printing operation together with the printing data or may be generated as separate printing operations, respectively. For example, the duplex printing command and the printing data of the pages among the total printing pages except the last page may be generated as a first printing operation, and the simplex printing command and the printing data of the last page may be generated as a second printing operation. Alternatively, the duplex printing command, the printing data of the pages among the total printing pages except the last page, the simplex printing command, and the printing data of the last page may be generated in one printing operation.

In operation 170, the generated printing commands and the printing data are transmitted to the image forming apparatus. Generated printing commands, including a duplex printing command with respect to the whole print data as generated in operation 150, a simplex printing command as generated with respect to printing data of the last page as generated in operation 140, and/or a simplex printing command as generated with respect to printing data which consists of one page as generated in operation 160, are transmitted to the image forming apparatus in operation 170. In other words, after a printing command and a piece of printing data are generated as a printing operation, the generated printing operation is transmitted to the image forming apparatus. The printing command is transmitted to the image forming apparatus with the printing data as a printing operation, and the printing data is printed according to the printing command. That is, if the printing command is a simplex printing command, printing data is output on one side of a printing medium, and if the printing command is a duplex printing command, printing data is output on both sides of a printing medium. Also, if the number of the total printing pages is an odd number, pages except the last page are printed on both sides of the printing media according to the duplex printing command, and the last page is output on one side.

Figure 2:
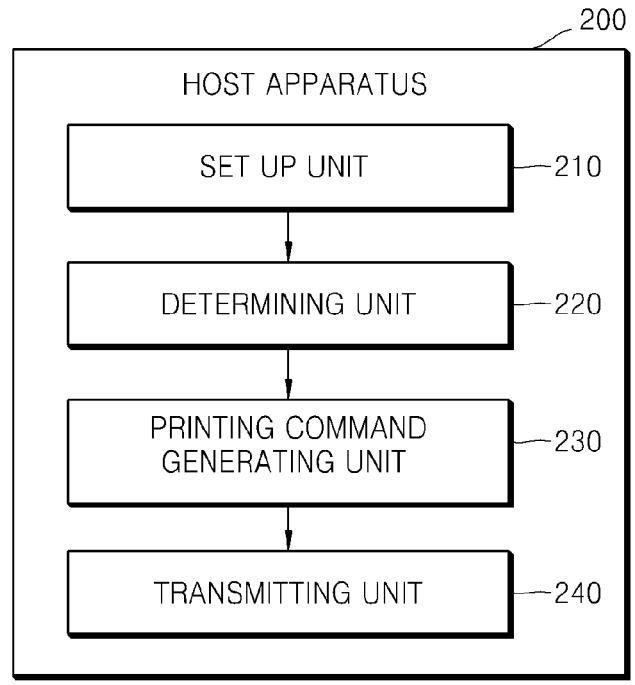
FIG. 2 is a block diagram illustrating a host apparatus to perform a method of controlling duplex printing according to an exemplary embodiment of the present general inventive concept.

FIG. 2 is a block diagram illustrating a host apparatus 200 to perform a method of controlling duplex printing according to an exemplary embodiment of the present general inventive concept.

Referring to FIG. 2, the host apparatus 200 that performs the method of controlling duplex printing according to an exemplary embodiment of the present general inventive concept includes a set up unit 210, a determining unit 220, a printing command generating unit 230, and a transmitting unit 240.

The set up unit 210 sets a printing mode with respect to printing data. The printing mode may be set by a user, may be predetermined according to the printing data, may be a default setting of the host apparatus, etc. That is, various functions are set when printing out printing data in an image forming apparatus. A duplex printing mode is set in order to print printing data on both sides of printing media. When a duplex mode is set in set up unit 210, a signal is transmitted from the set up unit 210 to the determining unit 220 corresponding to the duplex mode.

The determining unit 220 determines whether a number of total printing pages of the printing data is an even number or an odd number. The number of total pages of the printing data may be stored in the printing data as printing data information. The determining unit 220 may read the printing data information to determine the number of pages of the printing data. The determining unit 220 determines the number of pages of the printing data to determine whether the number of the total printing pages of the printing data is an even number or an odd number. The result of determination of the determining unit 220 is transmitted to the printing command generating unit 230.

The printing command generating unit 230 generates a printing command with respect to printing data based on the result of the determination of the determining unit 220. That is, the printing command generating unit 230 generates different printing commands according to whether the number of the total printing pages of the printing data is an even number or an odd number. If the number of the total printing pages is an even number, a duplex printing command is generated with respect to the printing data. If the number of the total printing pages is an odd number, a duplex printing command is generated with respect to the printing data for pages from among the total printing pages except a last page, and a simplex printing command is generated with respect to the printing data for the last page. For example, if the number of the total printing pages of printing data is 8, a duplex printing command is generated with respect to the all printing data. If the number of the total printing pages is 7, a duplex printing command is generated with respect to printing data on pages 1 to 6, and a simplex printing command is generated with respect to printing data on page 7. However, the printing command generating unit 230 generates a simplex printing command if the number of printing pages is 1, i.e., if the number of printing pages is odd and less than 3, or if a simplex printing mode is set in the set up unit 210. Also, the printing command generating unit 230 generates the generated printing command and the printing data as one printing operation, or the printing command generating unit 230 generates a simplex printing command and a duplex printing command, and corresponding printing data, as separate printing operations. According to the present exemplary embodiment, the printing command generating unit 230 generates the duplex printing command and the printing data for pages from among the total printing pages except the last page as a first printing operation, and the simplex printing command and the printing data of the last page as a second printing operation. If the number of total printing pages is an odd number, the printing command generating unit 230, according to another exemplary embodiment may generate a duplex printing command, printing data for the total printing pages except a last page, a simplex printing command, and printing data for the last page, in one printing operation. The generated printing command(s) are transmitted to the transmitting unit 240 as one printing operation or separate printing operations.

The transmitting unit 240 transmits the printing commands and the printing data to the image forming apparatus. In other words, a printing operation including the printing commands and the printing data is transmitted to the image forming apparatus.

Figure 3:
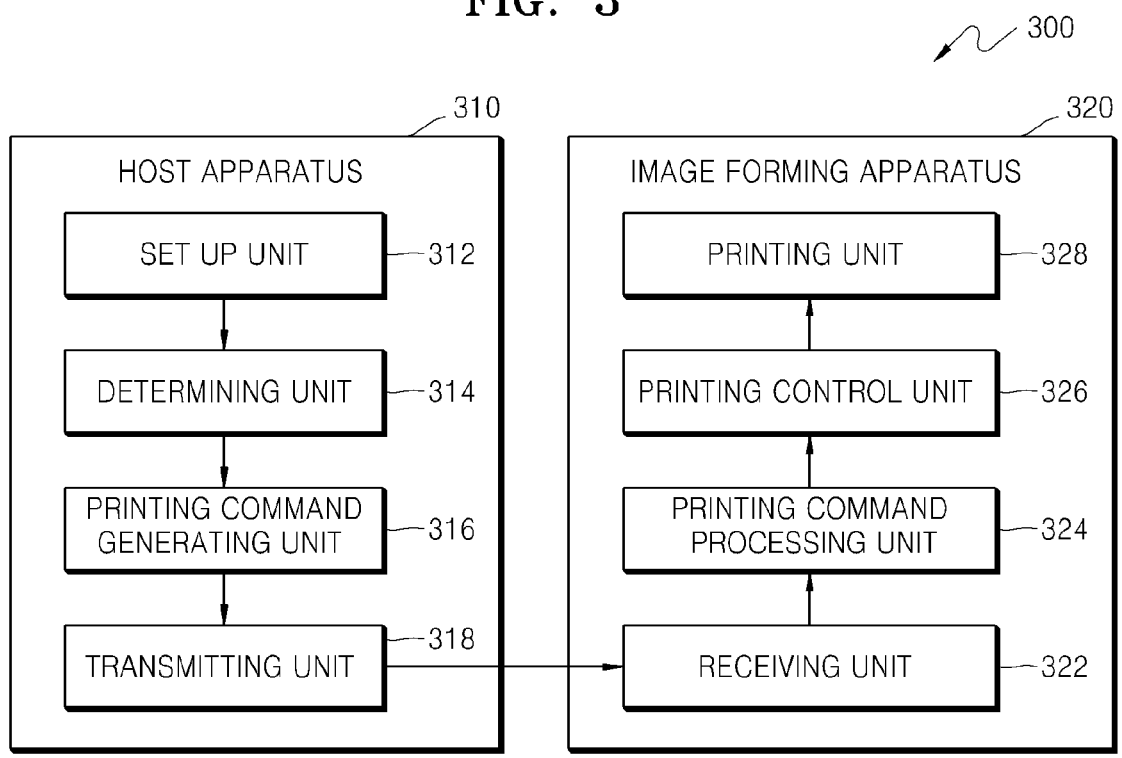
FIG. 3 is a schematic view illustrating a system to perform a method of controlling duplex printing according to an exemplary embodiment of the present general inventive concept.

FIG. 3 is a schematic view illustrating a system 300 to perform a method of controlling duplex printing according to an exemplary embodiment of the present general inventive concept. As illustrated in FIG. 3, the system 300 includes a host apparatus 310 and an image forming apparatus 320.

The host apparatus 310 includes a set up unit 312, a determining unit 314, a printing command generating unit 316, and a transmitting unit 318. In the host apparatus 310, when the set up unit 312 sets a duplex printing mode, a signal corresponding to the duplex printing mode is transmitted to the determining unit 314 which determines whether a number of total pages of printing data is an odd number or an even number. The result of the determination of the determining unit 314 is transmitted to the printing command generating unit 316, and the printing command generating unit 316 generates different printing commands according to whether the number of the total pages of printing data is an odd number or an even number. If the number of the total pages of the printing data is an even number, a duplex printing command is generated with respect to the printing data. If the number of the total pages of the printing data is an odd number, a duplex printing command is generated with respect to the printing data for the pages from among the total pages except a last page, and a simplex printing command is generated with respect to the printing data for the last page. The generated printing command(s) and the printing data may be generated in separate printing operations or in one printing operation.

The printing commands generated through the printing command generating unit 316 and the printing data are transmitted to the image forming apparatus 320 via the transmitting unit 318. The transmitting unit 318 of the host apparatus 310 transmits the printing operation(s) including the printing command(s) and the printing data to the image forming apparatus 320.

The image forming apparatus 320 includes a receiving unit 322, a printing command processing unit 324, a printing control unit 326, and a printing unit 328. The receiving unit 322 receives the printing operation including the printing command(s) and the printing data from the transmitting unit 318 of the host apparatus 310. The received printing operation(s) are transmitted to the printing command processing unit 324. The printing command processing unit 324 interprets the printing command(s) of the printing operation(s) and transmits the result of interpretation to the printing control unit 326. The printing control unit 326 controls the printing unit 328 such that the printing unit 328 performs the printing operation(s) based on the result of the interpretation of the received printing commands received from the printing command processing unit 324. Accordingly, the image forming apparatus 320 performs the printing operation(s) of the printing data according to the received printing data and the printing commands.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, Blu-Ray discs, magnetic tapes, floppy disks, optical data storage devices, and the like. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of controlling duplex printing of a system comprising an image forming apparatus including a duplex printing function and a simplex printing function and a host apparatus to transmit printing data to the image forming apparatus, the method comprising:

determining, by the host apparatus, whether a number of total printing pages for the printing data is an even number or an odd number greater than or equal to three;

generating, by the host apparatus, if the number of total printing pages is the odd number greater than or equal to three, a first operation and a second operation, where the first operation includes a duplex printing command and a duplex printing data which corresponds to the pages except the last page in the printing data and the second operation includes a simplex printing command and a simplex printing data corresponds to the last page in the printing data; and transmitting, by the host apparatus, the generated first and second operation separately to the image forming apparatus.

2. The method of claim 1, further including generating the duplex printing command for the printing data when the number of the total printing pages is an even number.

3. The method of claim 1, wherein the determining is performed only when a duplex printing mode is set for the printing data.

4. The method of claim 1, further including, when the number of total printing pages is one, generating the simplex printing command for the printing data.

5. A host apparatus to transmit printing data to an image forming apparatus having a duplex printing function and a simplex printing function, the host apparatus comprising:
   a determining unit to determine whether a number of total printing pages of the printing data is an even number or an odd number greater than or equal to three;
   a printing command generating unit to generate, if the number of total printing pages is the odd number greater than or equal to three, a first operation and a second operation, where the first operation includes a duplex printing command and a duplex printing data which corresponds to the pages except the last page in the printing data, and the second operation includes a simplex printing command and a simplex printing data corresponds to the last page in the printing data; and
   a transmitting unit to transmit the generated first and second operation separately to the image forming apparatus.

6. The host apparatus of claim 5, wherein the printing command generating unit generates the duplex printing command for the printing data when the number of the total printing pages is an even number.

7. The host apparatus of claim 5, further comprising:
   a set up unit to set a printing mode for the printing data,
   wherein the determining unit operates only when a duplex printing mode is set up by the set up unit.

8. The host apparatus of claim 5, wherein, when the number of the total printing pages is one, the printing command generating unit generates the simplex printing command for the printing data.

9. A system to control duplex printing, comprising:
   a host apparatus to generate a printing command for printing data according to whether a number of total printing pages of the printing data is an even number or an odd number; and
   an image forming apparatus to print the printing data according to the printing command received from the host apparatus,
   wherein the host apparatus comprises:
   a set up unit that sets a printing mode for the printing data;
   a determining unit to determine whether a number of total printing pages of the printing data is an even number or an odd number greater than or equal to three;
   a printing command generating unit to generate, if the number of total printing pages is the odd number greater than or equal to three, a first operation and a second operation, where the first operation includes a duplex printing command and a duplex printing data which corresponds to the pages except the last page in the printing data, and the second operation includes a simplex printing command and a simplex printing data corresponds to the last page in the printing data; and
   a transmitting unit to transmit the generated first and second operation separately to the image forming apparatus.

10. The system of claim 9, wherein the printing command generating unit generates the duplex printing command for the printing data when the number of the total printing pages is an even number.

11. The system of claim 9, wherein the printing command generating unit generates the simplex printing command for the printing data when the number of the total printing pages is one.

12. The system of claim 9, wherein the image forming apparatus comprises:
   a receiving unit to receive the generated first operation and the generated second operation separately from the host apparatus;
   a printing command processing unit to interpret the generated first operation and the generated second operation;
   a printing unit to print the printing data based on the interpretation of the generated first operation and the generated second operation; and
   a printing control unit to receive the interpreted of the generated first operation and the generated second operation and to control the printing unit based on the interpreted of the generated first operation and the generated second operation.

\* \* \* \* \*